(12) United States Patent
Hsu

(10) Patent No.: US 6,575,002 B1
(45) Date of Patent: Jun. 10, 2003

(54) VEHICLE PEDAL LOCK AND METHOD THEREFOR

(75) Inventor: Henry T. H. Hsu, Old Westbury, NY (US)

(73) Assignee: American Auto Accessories, Inc., Corona, NY (US)

( * ) Notice: Subject to any disclaimer, the term of this patent is extended or adjusted under 35 U.S.C. 154(b) by 0 days.

(21) Appl. No.: 10/199,637

(22) Filed: Jul. 19, 2002

(51) Int. Cl.[7] .............................................. B60R 25/00
(52) U.S. Cl. ......................................... 70/202; 70/237
(58) Field of Search .......................... 70/198–203, 237, 70/238, 254

(56) References Cited

U.S. PATENT DOCUMENTS

| | | | |
|---|---|---|---|
| 2,330,536 A | 9/1943 | Zimmermann | 70/199 |
| 4,699,238 A | 10/1987 | Tamir | 180/287 |
| 5,282,373 A | 2/1994 | Riccitelli | 70/199 |
| 5,537,846 A | 7/1996 | Simon | 70/202 |
| 5,713,539 A | 2/1998 | Russ et al. | 244/224 |
| 5,715,710 A | 2/1998 | De Lucia et al. | 70/202 |
| 5,870,912 A | 2/1999 | Vito | 70/202 |
| 5,881,587 A | 3/1999 | Vito | 70/202 |
| 5,906,121 A * | 5/1999 | Mankarious | 70/199 |
| 5,979,197 A | 11/1999 | Mellini et al. | 70/199 |
| 6,439,012 B1 * | 8/2002 | Chen | 70/202 |

FOREIGN PATENT DOCUMENTS

| | | | |
|---|---|---|---|
| EP | 404709 | * 12/1990 | 70/202 |

* cited by examiner

*Primary Examiner*—Lloyd A. Gall
(74) *Attorney, Agent, or Firm*—Robert C. Kain, Jr.; Fleit, Kain

(57) ABSTRACT

The invention relates to a vehicle pedal lock having two elongated members that slide relative to each other. A stationary member has a base plate at one terminal end for placement on the floor of the vehicle. The stationary member defines a longitudinal channel through which slides the second, movable member. An upper pedal bracket supported by a yoke is mounted on the stationary member near the end of the longitudinal channel. The movable member has a lower pedal bracket at its terminal end. The movable member includes lock detents used to lock the movable member relative to the stationary member via a key-lock mounted to the stationary member. The key-lock includes a locking pin engageable with the locking detents. The pedal lock is adapted to capture and lock the vehicle pedal between the upper and lower pedal brackets such that the pedal may not be depressed.

7 Claims, 3 Drawing Sheets

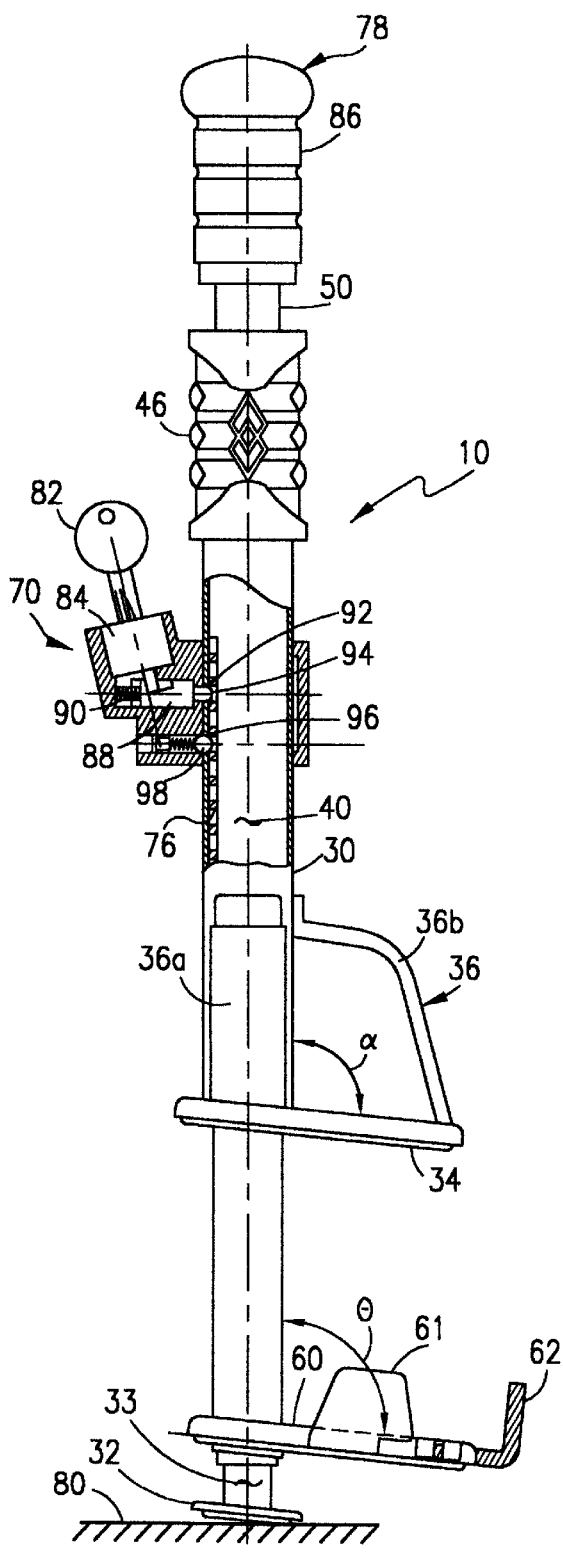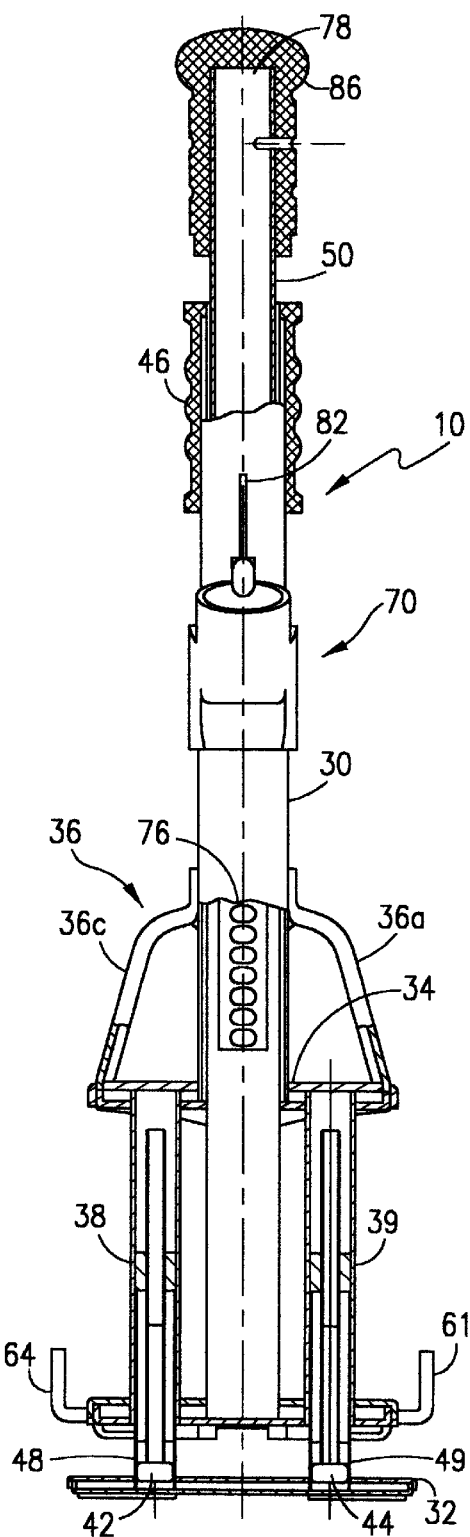
FIG. 1
FIG. 2

VEHICLE PEDAL LOCK AND METHOD THEREFOR

The present invention relates to a vehicle pedal lock which prevents the use of a swinging vehicle control pedal by capturing the pedal between two pedal brackets and holding it immobile. The present invention includes a method of locking a vehicle pedal.

BACKGROUND OF THE INVENTION

There are other control pedal disabling devices. However, none have all the features of the present invention, and none function as simply as the present invention. For example, U.S. Pat. No. 5,537,846 to Simon, discloses a control pedal disabling device having an outer housing and an inner shaft member mounted within the housing for relative rotary and telescopic movement. A first clamp structure is journaled on the shaft and a second clamp structure is threaded on the shaft so that, as the shaft is rotated in the housing, the clamp members are moved toward and away from each other into and out of locking engagement with the brake pedal. The inner shaft and outer housing are slid telescopically relative to each other to engage the fire wall of the vehicle with the clamp members clamped about the brake pedal (Abstract).

U.S. Pat. No. 5,715,710 to De Lucia et al., discloses a brake pedal immobilizing device which captures the shaft of the control pedal. De Lucia '710 discloses a device having first and second shafts with crossheads mounted thereon to clamp a brake pedal shaft between them (col. 5, lines 21–25). U.S. Pat. No. 5,881,587 to Vito, similarly discloses a shaft-locking device for locking the brake or clutch of a vehicle in which a U-shaped housing extending downward is used to capture the shaft of the pedal between the arms that make up the U. The downward extending U-shaped housing has a first arm attached to the base of the device and has a second shorter arm which defines a gap for receipt of the brake or clutch pedal shaft. The device includes a locking means associated with the second arm for locking the underside of the pedal (col. 2, line 66—col. 3, line 9). This locking means is a rod 28 with a pin 26. As shown in FIG. 4, as the rod 28 extends upward, the pin 26 enters the slot 22, pulls up and secures the bottom of the brake pedal 13 in an upward or extended position so that it cannot be depressed (col. 4, line 65—col. 5, line 2).

U.S. Pat. No. 5,979,197 to Mellini, et al., also discloses a shaft-locking or pedal arm locking device. The device includes a first member having a lower movable plate and a shaft extending therefrom. A second member is provided with an upper stationary plate that includes a second hollow shaft. The first shaft slides in the second hollow shaft, whereby the upper and lower movable plates are adapted to receive a pedal arm of a vehicle therebetween (abstract).

Other past devices include a locking mechanism between the steering wheel of a vehicle and the vehicle pedal such as U.S. Pat. No. 4,699,238 to Tamir (road vehicles) and U.S. Pat. No. 5,713,539 to Russ et al. (aircraft controls).

There is a need for a simple, sturdy, locking vehicle pedal device which captures the subject vehicle pedal such that the vehicle pedal is rendered inoperable.

OBJECTS OF THE INVENTION

It is an object of the present invention to provide a simple to use, sturdy, locking vehicle pedal device for a movable pedal.

It is another object of the present invention to provide a vehicle pedal lock for a movable pedal which includes a first elongated member having a base plate at one distal terminal end, the elongated member defining a longitudinal channel through at least a portion of the first elongated member. The base plate is adapted to rest against the floor of the vehicle substantially beneath the vehicle pedal. The vehicle pedal lock includes an upper pedal bracket mounted on the first elongated member near a distal end of the longitudinal channel. The upper pedal bracket is supported on the first elongated member by a three-prong yoke or brace. The pedal lock includes a second elongated member slidably engaged by the first elongated member in the longitudinal channel. The second elongated member includes a lower pedal bracket at a distal terminal end of the second elongated member. The lower pedal bracket has at least one adjustable claw used to limit lateral movement of the vehicle pedal upon its capture within the vehicle pedal locking device.

It is a further object of the present invention to provide a method for locking a movable vehicle pedal such that the pedal is rendered inoperable.

SUMMARY OF THE INVENTION

The present invention provides a sturdy vehicle pedal lock for a movable pedal of a vehicle which includes a first elongated member having a base plate at one distal terminal end, the elongated member defining a longitudinal channel through at least a portion of the first elongated member. The base plate is adapted to rest against the floor or fire wall of the vehicle substantially beneath the vehicle pedal. The vehicle pedal lock includes an upper pedal bracket mounted on the first elongated member near a distal end of the longitudinal channel. The upper pedal bracket is supported on the first elongated member by a three-prong yoke or brace. The pedal lock includes a second elongated member slidably engaged by the first elongated member in the longitudinal channel. The second elongated member includes a lower pedal bracket at a distal terminal end of the second elongated member. The lower pedal bracket has at least one adjustable claw used to limit lateral movement of the vehicle pedal upon its capture within the vehicle pedal locking device. The second elongated member has an extendable free proximal terminal end, opposite the lower pedal bracket such that the lower pedal bracket slidably moves with respect to the upper pedal bracket, and includes lock detents on the second elongated member. A key-lock, including a locking pin which engages the locking detents, is mounted to the first elongated member. The first and second elongated members are adapted to capture and lock the vehicle pedal between the upper and lower pedal brackets such that the pedal may not be depressed.

The present vehicle pedal lock includes a spring-biased temporary latch which engages a series of crests and valleys on the second elongated member whereby the first and second elongated members slide in predetermined increments.

The present invention also includes a surface interface between the temporary latch and the second elongated member which produces tactile and audible responses.

The present invention includes a method of locking a movable vehicle pedal.

BRIEF DESCRIPTION OF THE DRAWINGS

Further objects and advantages of the present invention can be found in the detailed description of the preferred embodiments when taken in conjunction with the accompanying drawings in which:

FIG. 1 diagrammatically illustrates a side view of the vehicle pedal lock;

FIG. 2 diagrammatically illustrates a back view of the vehicle pedal lock;

DETAILED DESCRIPTION OF THE PREFERRED EMBODIMENTS

Figure 8:
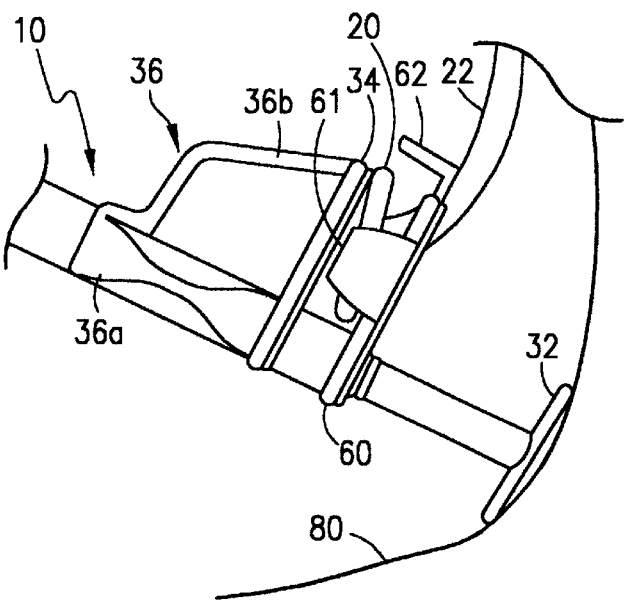
FIG. 8 diagrammatically illustrates the pedal vehicle lock with a locked pedal captured between the upper and lower pedal brackets.

The present invention relates to a sturdy, easy to use, vehicle pedal lock which prevents the use of a swinging vehicle control pedal by capturing the pedal between two pedal brackets and holding it immobile. The present invention also includes a method of locking a vehicle FIG. 1 diagrammatically illustrates the vehicle pedal lock 10. FIG. 2 diagrammatically illustrates a back view of vehicle pedal lock 10. The vehicle pedal lock includes two elongated sliding members 30, 50. The two sliding members, including other associated components, are individually illustrated in FIGS. 3A and 4A. Similar items are identified with the same reference numerals throughout the drawings. The first elongated member 30 may also be referenced as the stationary member. Stationary member 30 includes base plate 32 attached to the terminal end 33. Base plate 32 may be attached to stationary member 30 through rivet, bolt/nut, weld, hinge or the like as known to those with ordinary skill. Base plate 32 is adapted to rest against the floor 80 or firewall of the vehicle (FIG. 8). For ease in understanding the present invention, spacial reference to "distal" will refer to a position farthest away from a user of the pedal lock and reference to "proximal" will be refer to positions closer to the user.

Figures 3A, 3B, 3C, 4A, 4B:
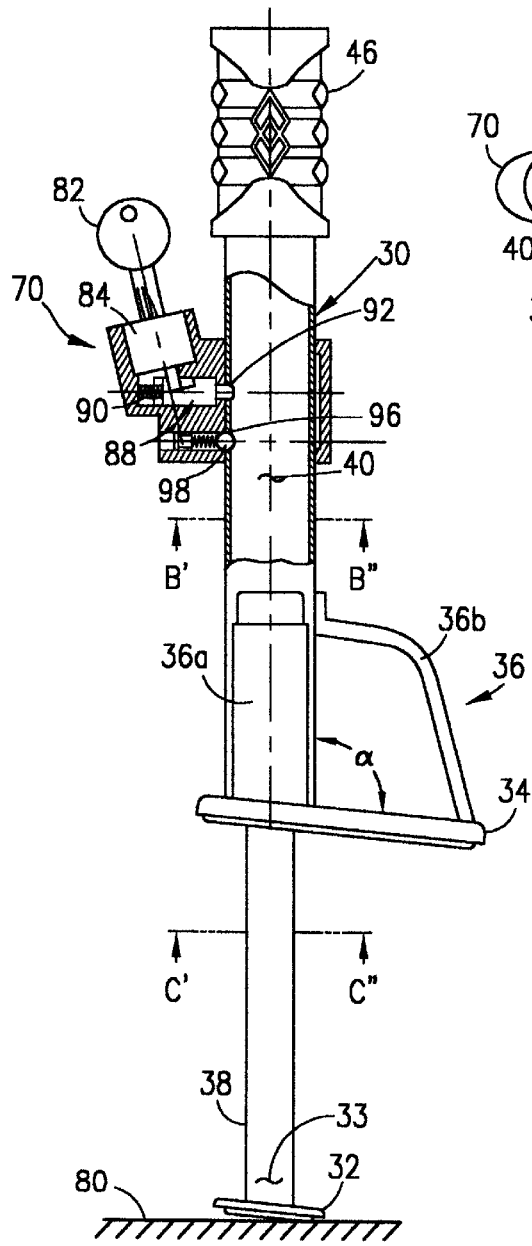
FIG. 3A diagrammatically illustrates a side view of the stationary elongated member of the vehicle pedal lock.
FIG. 3B diagrammatically illustrates a cross-sectional view of the stationary member from the perspective of B'–B"
FIG. 3C diagrammatically illustrates a cross-sectional view of the stationary member from the perspective of C'–C"
FIG. 4A diagrammatically illustrates a front view of the movable elongated member of the vehicle pedal lock.
FIG. 4B diagrammatically illustrates a cross-sectional view of the movable elongated member from the perspective of B'–B"

Stationary member 30 includes a proximal portion which defines an interior longitudinal channel 40. Stationary member 30 defines a longitudinal channel 40 having a spherical or rectangular cross-sectional shape. The embodiment illustrated in FIG. 3A has a longitudinal channel 40 having a rectangular or square cross-sectional shape (see FIG. 3C, a cross-sectional view from the perspective of line C'C" in FIG. 3A). Stationary or first elongated member 30 includes an upper pedal bracket 34 which is attached at the distal end of interior longitudinal channel 40. In FIGS. 1 and 3A, upper pedal bracket 34 is attached to stationary member 30 at an angle a slightly larger than 90 degrees. Upper bracket 34 may also be attached perpendicular to stationary member 30. Upper bracket 34 is supported by a three-prong brace or yoke 36. Brace or yoke 36 is attached to the upper pedal bracket 34 at or near the outer boundaries of the bracket to support and reinforce the upper pedal bracket 34. The three prongs balance any force applied to bracket 34 and spread the force from the bracket to the stationary member 30. This is important because when the lock is attacked by a car thief, the present structure is stronger than prior art devices. In addition, yoke 36 serves to shield the upper pedal bracket from a person's attempt to step on upper pedal bracket 34 when the vehicle lock is in use. The arms 36a, 36b and 36c of yoke 36 may be uniform in dimension as illustrated in FIGS. 1 and 2 or may be stylized as in FIG. 8.

Figure 5:
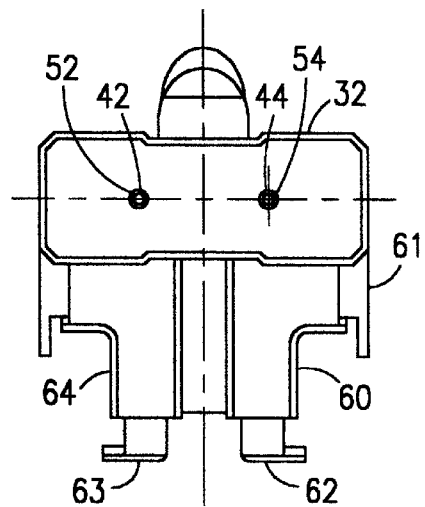
FIG. 5 diagrammatically illustrates a bottom view of the vehicle pedal lock.

In the embodiment illustrated in FIGS. 1–3C, the distal end of stationary member 30 also includes support legs 38, 39 (see FIGS. 2 and 3C). The support legs 38, 39 may have slidable sections 48, 49, respectively, which are used to adjust the relatively fixed distance between the base plate 32 and upper pedal bracket 34 to suit the particular vehicle. The slidable sections 48, 49 are extended or retracted using screw adjustments 42, 44. The proximal ends of support legs 38, 39 are attached to the underside or distal side of upper pedal bracket 34. Base plate 32 is attached to the distal ends of support legs 38, 39. As illustrated in FIGS. 2 and 5, support legs 38, 39 may be adjusted using screw adjustments 42, 44 located internal the support legs. In the embodiment illustrated in FIG. 5, the adjustment screws are accessible through apertures 52, 54 in the base plate 32. In another embodiment (not shown), rather than having the two support legs 38, 29, the distal end of stationary member 30 is a single U-shaped channel which allows the distal end of second elongated member 50 to slide therein.

FIG. 3C diagrammatically illustrates a cross-sectional view of stationary member 30 from the perspective of reference line C'C" in FIG. 3A. In FIG. 3C, both the interior longitudinal channel 40 and the support legs 38, 39 have a substantially rectangular or square cross-sectional shape. Other cross-sectional shapes may also be used.

FIG. 3B diagrammatically illustrates a cross-sectional view of stationary member 30 from the perspective of reference line B'B". Again, longitudinal channel 40 has a rectangular cross-sectional shape.

Stationary member 30 may also include a grip 46 at its proximal end. In FIGS. 1 and 3B, grip 46 is slid onto the proximal end of stationary member 30. Grip 46 may be made of various materials, such as rubber, plastic or the like. Grip 46 may also include a projecting member such that it can be utilized as a handle.

The second elongated member 50 of vehicle pedal lock 10 is diagrammatically illustrated in FIG. 4A. Second elongated member 50 may also be referred to as movable member 50 because it is slidably engaged by the stationary member 30 viz-a-viz the longitudinal channel 40. Part of movable member 50 slides within longitudinal channel 40. Movable member 50 includes a lower pedal bracket 60 attached at its distal end 65. In FIG. 1, lower pedal bracket 60 is attached to movable member 50 at an angle θ which is slightly greater than 90 degrees. Lower pedal bracket 60 may also be perpendicularly mounted to movable member 50.

Figure 6:
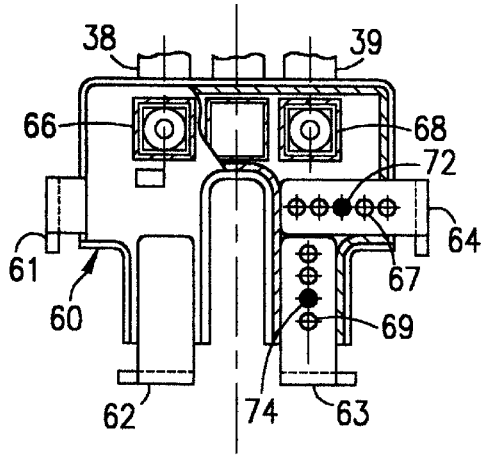
FIG. 6 diagrammatically illustrates the bottom pedal bracket having four adjustable claws.

Lower pedal bracket 60 includes one or more movable claws 61, 62 (FIG. 1) which are used to limit lateral or side-to-side movement of the vehicle pedal once placed in the vehicle pedal lock 10. FIG. 6 diagrammatically illustrates a partial cross-section of the lower pedal bracket 60 from a bottom view perspective. The support legs 38, 39 of stationary member 30 slide through square-shaped holes or apertures 66, 68 defined by the lower pedal bracket 60. Each of the L-shaped claws 61, 62, 63, 64 in FIGS. 1–6 are adjustable. In the embodiment illustrated in FIG. 6, claws 63, 64 each has a set screw or adjustment fastener 72, 74 which is used to secure the respective claw to the lower pedal bracket 60. The claws 63, 64 can be extended away or compressed toward the lower pedal bracket 60 by removing fasteners 72, 74 and sliding the claws 63, 64 such that a different hole from the series of holes 67, 69 align, with the fastener location. In FIGS. 1 and 8, the side of claw 61 shows that the tooth-like protrusion extends proximally. The claws are important because the claws, in combination with the pedal bracket, embrace the pedal with a moderately close fit thereby prohibiting the thief from pushing the pedal bracket away from the pedal.

Movable member 50 also has an extendable, free, proximal, terminal end 78. The movable member 50 includes another grip 86 attached to the terminal end 78 which facilitates the use of the vehicle pedal lock 10.

FIG. 4A diagrammatically illustrates movable member 50 having a series of lock detents 76 along its surface. The lock detents 76 are used in conjunction with the lock device 70 mounted to stationary member 30. The lock detents 76 define a series of crests and valleys. In FIG. 4A, only a portion of movable member 50 includes the lock detents 76.

As shown in FIG. 1, stationary member 30 includes a key-lock device 70 used to lock the vehicle pedal lock 10. In FIGS. 1–4, key-lock 70 is mounted in a cylindrical chamber on stationary member 30 near its proximal end. Key-lock 70 includes a key 82 which fits into key-insert or locking tumbler 84. The key 82 may be a cross-key (X key) or conventional flat key. Locking tumbler 84 interacts with locking pin 88. Locking pin 88 is biased such that the tip 94 of locking pin 88 tends to project into the locking pin hole 92 defined by the lateral wall of stationary member 30. The tip 94 of locking pin 88 must be of sufficient length to traverse the wall of stationary member 30 and project into the valleys defined by the locking detents 76 on movable member 50. Locking pin 88 is biased by spring 90. Other biasing elements may be used such as a tension barb or the like.

Figure 7:
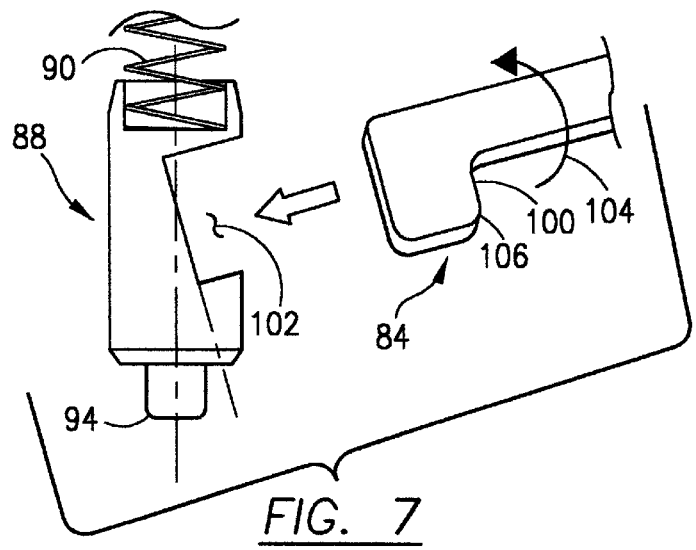
FIG. 7 diagrammatically illustrates a key-lock mechanism including the locking pin used to lock the vehicle pedal lock.

As diagrammatically illustrated in FIG. 7, locking insert 84 and locking pin 88 define a cam/cam-follower type of mechanical system. Tumbler 84 includes an L-shaped projection 100 which cooperates with gap 102 defined by locking pin 88. The L-shaped cam-like projection 100 is slid into the gap 102 as indicated by the arrow in FIG. 7. When key 82 is turned 90 degrees (as shown by arrow 104), the lateral portion 106 of the L-shaped projection 100 turns with the key 82, allowing locking pin 88 to move inboard through pin hole 92 and into one of the valleys defined by locking detents 76. Of course, the pin may be biased in either direction.

Stationary member 30 also includes a temporary latch pin 98. In FIGS. 1 and 3A, latch pin 98 is illustrated as a biased temporary latch ball which projects through a hole 96 in the lateral wall of stationary member 30, and interacts with the locking detents 76 of movable member 50. The dimension of lock ball 98 is such that only a portion of the ball 98 projects into the spaces or valleys defined by the locking detents 76. Accordingly, slidable member 50 is able to slide through stationary member 30 when sufficient longitudinal force is applied to slidable member 50 relative to stationary member 30. The friction caused by the contact between temporary latch pin 98 and the crests defined by locking detents 76 creates tactile and audible responses to a person sliding the two elongated members 30, 50 relative to each other.

FIG. 8 diagrammatically illustrates the pedal vehicle lock 10 with a locked pedal 20 captured between the upper and lower pedal brackets 34, 60, respectively. The vehicle pedal 20 is attached to the end of pedal swingable stem 22. Pedal 20 may be an accelerator pedal, a brake pedal, a clutch pedal, an emergency brake pedal, or any other moving control pedal.

The vehicle pedal lock 10 works as follows The key 82 of the lock mechanism 70 is turned to the unlock position such that movable member 50 is free to move relative to stationary member 30. Movable member 50 is slid downward or distally by applying force longitudinally on the proximal free end 78, while keeping stationary member 30 stationary. This causes lower pedal bracket 60 to move distally away from proximal upper pedal bracket 34. Next, the base plate 32 of the pedal lock 10 is placed on the floor or fire wall 80 below the pedal 20, with lower pedal bracket 60 beneath or distal of the pedal 20. Next, the movable member 50 is pulled proximally towards the user while stationary member 30 is held relatively immobile. As movable member 50 is pulled proximally, lower pedal bracket 60 is aligned such that the bracket captures the pedal in the area of the bracket between the claws 61, 62, 63, 64. The claws are moved laterally, fore and aft to embrace the pedal. Claws are capable of extending into openings in the upper bracket. Further with the claws closely grasping the pedal end encasing the pedal with the upper and lower bracket, if the thief pushes the base away from the floor, the lock continues to embrace the pedal. Movable member 50 is pulled until the pedal 20 is captured between the upper and lower pedal brackets 34, 60 as illustrated in FIG. 8. Finally, key 82 is turned causing locking pin 88 to penetrate into locking detents 76 (see FIG. 1). Locking pin 88 prevents longitudinal movement of movable member 50 relative to stationary member 30.

The claims appended hereto are meant to cover modifications and changes within the scope and spirit of the present invention.

What is claimed is:

1. A vehicle pedal lock for a movable pedal in a vehicle having a swingable stem with a pedal attached at the end of the stem, said stem and attached pedal near a floor of said vehicle, the pedal lock comprising:

a first elongated member having a base plate at one distal terminal end, said elongated member defining a longitudinal channel through at least a portion of said first elongated member, said base plate adapted to rest against said floor substantially beneath said vehicle pedal;

an upper pedal bracket mounted on said first elongated member near a distal end of said longitudinal channel, said upper pedal bracket supported on said first elongated member by a three-prong yoke;

a second elongated member slidably engaged by said first elongated member in said longitudinal channel, said second elongated member having a lower pedal bracket at a distal terminal end of said second elongated member; said lower pedal bracket having at least one adjustable claw, said base plate being distal with respect to said lower pedal bracket;

said second elongated member having an extendable free proximal terminal end, opposite said lower pedal bracket such that said lower pedal bracket slidably moves with respect to said upper pedal bracket;

lock detents on said second elongated member;

a key-lock mounted to said first elongated member, said key-lock including a locking pin engageable with said lock detents; and whereby said first and second elongated members are adapted to capture and lock said vehicle pedal between said upper and lower pedal brackets such that said pedal may not be depressed.

2. A vehicle pedal lock as claimed in claim 1 wherein said, lock detents define a series of crests and valleys and wherein said first elongated member includes a spring-biased temporary latch engaging said crests and valleys on said second elongated member whereby said first and second elongated members slide in predetermined increments.

3. A vehicle pedal lock as claimed in claim 2 wherein said crests and valleys and said temporary latch define respective surfaces such that the predetermined incremental sliding produces tactile and audible responses.

4. A vehicle pedal lock as claimed in claim 1 wherein said second elongated member includes a grip at said extendable free proximal terminal end.

5. A vehicle pedal lock as claimed in claim 1 wherein said at least one adjustable claw of said lower pedal bracket is substantially proximally oriented such that said at least one claw blocks substantial lateral movement of said vehicle pedal when said pedal is captured and locked between said upper and lower pedal brackets.

6. A vehicle pedal lock as claimed in claim 1 wherein said longitudinal channel of said first elongated member has a substantially rectangular or square cross-sectional shape.

7. A method of locking a movable vehicle pedal in a vehicle having a swingable stem with a pedal attached at the end of the stem, said stem and attached pedal near a floor of said vehicle, the method comprising:

providing a first elongated member having a base plate at one distal terminal end and an upper pedal bracket having a three-prong support yoke attached to a proximal portion of said first elongated member;

placing said base plate against said floor near said vehicle pedal such that said vehicle pedal is distal of said upper pedal bracket of said first elongated member;

providing a second elongated member slidably engaged with said first elongated member and having a lower pedal bracket at a distal terminal end of said second elongated member;

proximally pulling said second member such that said lower pedal bracket captures said vehicle pedal between said lower pedal bracket and said upper pedal bracket; and locking said first elongated member with respect to said second member such that said pedal is immobile with respect to said floor.

\* \* \* \* \*